(12) United States Patent
Hirst et al.

(10) Patent No.: US 6,307,584 B1
(45) Date of Patent: Oct. 23, 2001

(54) SINGLE POLYGON SCANNER FOR MULTIPLE LASER PRINTER

(75) Inventors: B. Mark Hirst; K. Trent Christensen, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/377,893

(22) Filed: Aug. 19, 1999

(51) Int. Cl.[7] .................................................. B41J 27/00
(52) U.S. Cl. ............................................. 347/243; 347/259
(58) Field of Search .................................. 347/116, 134, 347/243, 259, 260, 261, 225, 241; 359/17, 18, 197, 200, 212, 213, 214, 216, 217, 226, 220

(56) References Cited

U.S. PATENT DOCUMENTS

| | | | |
|---|---|---|---|
| 5,018,805 | 5/1991 | Kessler | 347/232 |
| 5,218,413 | 6/1993 | Kanai | 347/226 |
| 5,251,055 | * 10/1993 | Koide | 359/216 |
| 5,291,223 | * 3/1994 | Ogane et al. | 347/116 |
| 5,497,252 | * 3/1996 | Ben-David | 359/17 |
| 5,627,579 | * 5/1997 | Fisli | 347/225 |
| 5,739,940 | 4/1998 | Kondo | 359/204 |
| 5,861,904 | * 1/1999 | Kamir et al. | 347/245 |
| 6,046,835 | * 4/2000 | Yamakawi et al. | 347/243 |

FOREIGN PATENT DOCUMENTS

| | | |
|---|---|---|
| 0388981 A2 | 9/1990 | (EP) . |
| 0947335 A2 | 10/1999 | (EP) . |
| 58079215 | 5/1983 | (JP) . |
| 6171157 | 6/1994 | (JP) . |
| 090113830 | 5/1997 | (JP) . |

* cited by examiner

Primary Examiner—N. Le
Assistant Examiner—Hai C. Pham

(57) ABSTRACT

A color laser printer includes a photoconductor section having photoconductive material configured to be exposed to receive a plurality of color toners in a selective manner representative of a color image to be printed. The printer further includes a scanning section having a plurality of lasers, preferably four lasers, each of the lasers being configured to generate pulsed beams of laser energy to be directed to the photoconductor section to selectively expose the photoconductive material. The scanning section also includes a single, rotating, polygonal-sided mirror having at least four reflective facets corresponding to selected sides of the polygon. The polygonal-sided mirror is positioned relative to the lasers and the photoconductor section such that the pulsed beams of laser energy from each of the lasers are reflected by the reflective facets of the polygonal-sided mirror to a predetermined lineal position on the photoconductive material. Each predetermined lineal position is associated with a selected laser. As the polygonal-sided mirror rotates, the reflective facets are moved along a curved path to cause the beams of laser energy from each laser to be variably reflected from the reflective facets and thereby move along their corresponding predetermined lineal positions to selectively expose lines on the photoconductive material. Preferably, the scanning section, including the lasers, rotating mirror, and any accompanying optical elements, are contained in a single housing for securing the components of the scanning section in fixed, relative position to one another and to the photoconductor section.

21 Claims, 8 Drawing Sheets

SINGLE POLYGON SCANNER FOR MULTIPLE LASER PRINTER

FIELD OF THE INVENTION

This invention pertains to inline color laser printers, also known as electophotographic printers, and in particular to a scanning system for such a printer.

BACKGROUND

Color printing by an inline laser printer is achieved by scanning a digitized image onto a photoconductor using lasers. Such a printing process is known as electrophotographic printing. The lasers generate beams of laser energy which are pulsed according to the digitized data to be imaged on the photoconductor. The photoconductor typically comprises a drum or a belt coated with a photoconductive material capable of retaining localized electrical charges. Each localized area capable of receiving a charge corresponds to a pixel. Each pixel is charged to a base electrical charge, and then is either exposed or not exposed by the laser, as dictated by the digital data used to pulse the laser. Exposing a pixel corresponds to electrically altering (typically discharging) the localized area from the base electrical charge to a different electrical charge. One charge will attract toner, and the other charge will not. In this manner, toner is selectively transferred to the photoconductor. In most electrophotographic printing processes, the exposed (electrically discharged) pixels attract toner onto the photoconductor. This process is known as discharge area development (DAD). However, in some electrophotographic printing processes the toner is attracted to the un-discharged (i.e., charged) area on the photoconductor. This latter type of electrophotographic printing is known as charge-area-development (CAD). For purposes of discussion, it will be assumed that DAD is used, although the present invention is not limited to DAD.

Once the photoconductor has had the desired toner transferred to it, the toner is then transferred to the finished product medium. This transfer can either be direct or it can be indirect using an intermediate transfer device. The finished product medium typically comprises a sheet of paper, normally white, but can also comprise a transparency or a colored sheet of paper. After the toner is transferred to the finished product medium, it is processed to fix the toner to the medium. This last step is normally accomplished by thermally heating the toner to fuse it to the medium, or applying pressure to the toner on the medium.

There are a variety of known methods for selectively attracting toner to a photoconductor. Generally, each toner has a known electrical potential affinity. Selected areas of the photoconductor are exposed from a base potential to the potential for the selected toner, and then the photoconductor is exposed to the toner so that the toner is attracted to the selectively exposed areas. This latter step is known as developing the photoconductor. In some processes, after the photoconductor is developed by a first toner, the photoconductor is then recharged to the base potential and subsequently exposed and developed by a second toner. In other processes, the photoconductor is not recharged to the base potential after being exposed and developed by a selected toner. In yet another process, the photoconductor is exposed and developed by a plurality of toners, then recharged, and then exposed and developed by another toner. In certain processes, individual photoconductors are individually developed with a dedicated color, and then the toner is transferred from the various photoconductors to a transfer medium which then transfers the toner to the finished product medium. The selection of the charge-expose-develop process depends on a number of variables, such as the type of toner used and the ultimate quality of the image desired. The quality of the final image on the medium is typically associated with complexity and cost of the printer, such that higher quality electrophotographic printers which produce higher quality images are more complex, and concomitantly more expensive.

Image data for a laser printer, including color laser printers, is digital data which is stored in computer memory. The data is stored in a matrix or "raster" which identifies the location and color of each pixel which comprises the overall image. The raster image data can be obtained by scanning an original analog document and digitizing the image into raster date, or by reading an already digitized image file. The former method is more common to photocopiers, while the latter method is more common to printing computer files using an in-line printer. Accordingly, the technology to which the invention described below is applicable to either photocopiers or in-line printers. Recent technology has removed this distinction, such that a single printing apparatus can be used either as a copier or as a printer for computer files. These apparatus have been known as "mopiers", a term indicating the ability to act as a photocopier or an in-line printer. In either event, the image to be printed onto tangible media is stored as a raster image file. The raster image data is then used to pulse the beam of a laser in the manner described above so that the image can be reproduced by the electrophotographic printing apparatus. Accordingly, the expression "printer" should not be considered as limiting to a device for printing a file from a computer, but should also include a photocopier capable of printing a digitized image of an original document. "Original documents" include not already digitized documents such as text and image files, but photographs and other images, including hybrid text-image documents, which are scanned and digitized into raster data.

The raster image data file is essentially organized into a two dimensional matrix. The image is digitized into a number of lines. Each line comprises a number of discrete dots or pixels across the line. Each pixel is assigned a binary value relating information pertaining to its color and potentially other attributes, such as brightness. The combination of lines and pixels makes up the resultant image. The digital image is stored in computer readable memory as a raster image. That is, the image is cataloged by line, and each line is cataloged by each pixel in the line. A computer processor reads the raster image data line by line, and actuates the laser to selectively expose a pixel based on the presence or absence of coloration, and the type of coloration for the pixel. Typical pixel densities for high quality images are in the range of 300 to 1200 pixels per inch, in each direction.

The system for transferring the digital raster data to the photoconductor via a laser or lasers is known as the image scanning process or the scanning process. The scanning process is accomplished by a scanning portion or scanning section of the electrophotographic printer. The process of attracting toner to the photoconductor is known as the image transfer process or the transfer process, and is also known as the development process. The transfer process is accomplished by the transfer portion of the printer, also known as the developer section or develop portion of the electrophotographic printer. Image quality is dependent on both of these processes. Image quality is thus dependent on both the scanning portion of the printer, which transfers the raster data to the photoconductor, as well as the developer section portion of the printer, which manages the transfer of the toner to the photoconductor. The present invention is directed to the scanning process and the scanning section of the electrophotographic printer.

The typical inline color laser printer utilizes a plurality (typically 4) laser scanners to generate a latent electrostatic image for each color plane to be printed. The four color planes typically printed, and which are generally considered as necessary to generate a relatively complete palate of colors, are yellow, magenta, cyan and black. That is, the color printer is typically provided with toners in each of these four colors. These colors will be known herein as the "base colors". Preferably, the printer should have the capability of printing one base color on top of another on the same pixel, so as to generate a fuller palate of finished colors. More preferably, the printer should have the capability of depositing controllably varying amounts of toner on a pixel so as to further expand the palate of available colors.

In the scanning process, a laser is scanned from one edge of the photoconductor to the opposing edge and is selectively actuated or not actuated on a pixel-by-pixel basis to scan a line of the image onto the photoconductor. The photoconductor advances and the next line of the image is scanned by the laser onto the photoconductor. The photoconductor can be advanced discretely or in a continuous mode. In a multiple laser printer, more than one laser can be actuated simultaneously so as to more quickly generate the complete image onto the photoconductor. The side-to-side scanning of each laser is traditionally accomplished using a dedicated multi-sided or faceted rotating mirror. Such a mirror will be known herein as a "polygon" due to the polygonal shape of the mirror. The reflective surface of the mirrors are typically ground and polished aluminum. The laser beam impinges on one facet of the mirror and is reflected to a secondary or deflector mirror, which directs the laser beam to a unique, relative lineal position on the light sensitive surface of the photoconductor. By "relative", it is understood that the photoconductor moves with respect to the linear position, but the position remains fixed in space. As the polygonal mirror rotates, the angle of incidence, and hence the angle of reflection, of the laser beam will vary. This causes the laser beam to be scanned across the photoconductor at its unique relative lineal position from a first edge to a second edge of the photoconductor. As the mirror rotates to an edge of the polygon between facets, the laser is essentially reset to the first edge of the photoconductor to begin scanning a new line onto the advancing photoconductor. These mirrors tend to rotate at very high speeds—typically in excess of 20,000 rpm.

The quality of an image generated with an inline laser printer is usually directly associated with the generation of moiré patterns. Moiré patterns are undesirable distortions in the image which are the result of a pixel being generated in the photoconductor in a non-representative fashion as compared to the data in the raster image. Moiré patterns can be caused by a number of different things, some of which are attributable to the scanning process.

Ideally, the laser impinges on the photoconductor to generate a round pixel. Normally, the laser impinges on the photoconductor at a normal or perpendicular angle at the center of the photoconductor between the two side-to-side edges when the laser is striking the middle of the mirror facet. In this instance, the ideal "round" pixel is generated by the laser. However, as the laser scans across the photoconductor, it will tend to project an elliptical or oval shaped image on the photoconductor due to the changed angle of incidence of the laser on the photoconductor. This distortion is undesirable, and is classified as a moiré pattern. This distortion can be corrected to some degree using lenses (commonly known as "f-θ lenses" because they focus the beam with respect to the angle θ of the rotating polygonal mirror) to focus the laser beam, i.e., to bring the beam back to an essentially normal or perpendicular angel of incidence on the photoconductor. Since each laser needs these corrective lenses, the complexity and cost of the printer is affected.

Another source of moiré patters associated with the scanning process is the relative angle error from facet to facet within a single polygonal mirror. Ideally, each facet of the mirror should reflect the laser to the same point on the photoconductor for the same relative point on each mirror. However, due to manufacturing variances or grinding errors between mirror facets, as well as degenerative errors introduced by wear in the bearings supporting the rotating mirror, this is not always so. This results in beam deflection which is typically perpendicular to the side-to-side scan direction. This error can also be corrected to some degree by the use of alignment or centering lenses (typically, cylindrical lenses) to redirect the laser beam to the same relative point on the photoconductor regardless of which facet reflected the beam.

For color printing, it is important to assure the registration of the different colors. That is, each laser should be aligned with respect to the other lasers such that a given pixel in the raster image is associated with a single common point on the photoconductor, regardless of which laser is used to identify the point. A registration which is "off" will result in a blurry image, or an image with colors not representative of the raster image. Registration is thus dependent on aligning all of the lasers in a laser printer. Each laser and its associated components (i.e., rotating mirror, optical elements, and deflector mirror) are typically mounted in a precision housing to keep the components in relative fixed position with respect to one another. The housings are typically castings which are then machined to achieve the desired precision. Assuring registration of the lasers requires aligning the four housings within the printer itself. As environmental conditions within the printer change (e.g., temperature), this alignment can change.

FIG. 1 depicts a schematic side elevation diagram of a prior art four laser color printer "A". The printer "A" comprises a scanning section "B" and a photoconductor section "C". The photoconductor section shown here comprises a rotating belt 5 which supports a photoconductive material. Four developing stations, 6, 7, 8 and 9, are located proximate to the belt 5 and affix toner to the photoconductor in response to selective exposure of the photoconductive material by the laser beams at points "D", "E", "F" and "G" along the belt. For exemplary purposes only, developing station 6 can be the yellow developer, station 7 can be the magenta developer, station 8 can be the cyan developer, and station 9 can be the black developer.

The scanning section "B" in FIG. 1 comprises four scanning laser stations, 11, 12, 13 and 14. Each scanning station comprises a laser 15, a rotating mirror 16, a motor 17 for driving the mirror 16, a laser beam focusing lens 18, an aligning lens 19, a deflector mirror 21 for deflecting the laser beam onto the photoconductor belt 5, and a housing 22 for holding the aforementioned components.

Since only partial alignment of the laser beams with respect to one another can be achieve by aligning the housings which contain the scanning assemblies, in-line color printers are typically also provided with color plane sensors to sense color plane alignment. Sensors are provided to detect shifts in color planes in both the side-to-side scanning direction (the "scan" direction), as well as in the direction of advance of the photoconductor (i.e., the "process" direction). The sensors can provide a feedback to the scanning system and corrections can be made to reposition the laser beam using various known electrical and mechanical methods.

The space required within a printer unit for a plurality of scanning assembly housings tends to reduce the focal length which can be achieved with each laser (i.e., the distance from the focusing lens to the photoconductor surface). Generally, shorter focal lengths require higher quality optics to focus the beam over the shorter distances. Obtaining greater focal lengths with multiple scanning assemblies would require increasing the size of the printer. Since many printers are chosen for desk-top use, a large printer is undesirable.

Each rotating mirror assembly is driven by its own dedicated motor. The power consumption for each mirror driving motor is typically about 20 watts. Thus, for a four-laser printer, the mirror drives alone consume about 80 watts. This requires a larger power supply, generates a fair amount of heat, and generally adds cost and complexity to the overall printer design.

What is needed then is a color printer which reduces the complexity of the scanning section and which also increases the accuracy of the reproduction of the raster image onto the photoconductor.

SUMMARY OF THE INVENTION

The invention includes a color laser printer comprising a photoconductor section having photoconductive material configured to be exposed to receive a plurality of color toners in a selective manner representative of a color image to be printed. The printer further comprises a scanning section having a plurality of lasers, preferably four lasers, each of the lasers being configured to generate pulsed beams of laser energy to be directed to the photoconductor section to selectively expose the photoconductive material. The scanning section also includes a single, rotating, polygonal-sided mirror having a plurality of reflective facets, preferably at least four, corresponding to selected sides of the polygon. The polygonal-sided mirror is positioned relative to the lasers and the photoconductor section such that the pulsed beams of laser energy from each of the lasers are reflected by the reflective facets of the polygonal-sided mirror to a predetermined relative lineal position on the photoconductive material. Each predetermined relative lineal position is associated with a selected laser. As the polygonal-sided mirror rotates, the reflective facets are moved along a curved path to cause the beams of laser energy from each laser to be variably reflected from the reflective facets and thereby move along their corresponding predetermined relative lineal positions to selectively expose lines on the photoconductive material. Preferably, the scanning section, including the lasers, rotating mirror, and any accompanying optical elements, are contained in a single housing for securing the components of the scanning section in fixed, relative position to one another and to the photoconductor section.

The invention further includes a method for scanning a color image onto photoconductive material. The method comprises the acts of providing photoconductive material capable of being selectively configured with electrical charges to attract color toner, and providing at least a first and a second laser, each laser capable of generating a pulsed laser beam to selectively configure the photoconductive material with electrical charges. The method further includes providing a rotating, polygonal-sided mirror having a plurality of reflective facets corresponding to selected sides of the polygon. A first pulsed laser beam is generated with the first laser, and a second pulsed laser beam is generated with the second laser. The first pulsed laser beam is then directed to a first reflective facet of the polygonal-sided mirror to cause the first pulsed laser beam to be reflected to a first predetermined relative lineal position on the photoconductive material, and the second pulsed laser beam is directed to a second reflective facet of the polygonal-sided mirror to cause the second pulsed laser beam to be reflected to a second predetermined relative lineal position on the photoconductive material. The polygonal-sided mirror is rotated to cause the first and second pulsed laser beams to move across the photoconductive material along their respective first and second predetermined relative lineal positions on the photoconductive material. This causes the photoconductive material along the respective relative lineal positions to be selectively configured with electrical charges to attract color toner.

The method can further include the steps of providing a third and a fourth laser each capable of generating a pulsed laser beam to selectively configure the photoconductive material with electrical charges. A third pulsed laser beam is generated with the third laser, and a fourth pulsed laser beam is generated with the fourth laser. The third pulsed laser beam is directed to a third reflective facet of the polygonal-sided mirror to cause the third pulsed laser beam to be reflected to a third predetermined relative lineal position on the photoconductive material. The fourth pulsed laser beam is directed to a fourth reflective facet of the polygonal-sided mirror to cause the fourth pulsed laser beam to be reflected to a fourth predetermined relative lineal position on the photoconductive material. The rotating of the polygonal-sided mirror causes the third and fourth pulsed laser beams to move across the photoconductive material along their respective third and fourth predetermined relative lineal positions on the photoconductive material and thereby selectively configured the photoconductive material along the respective relative lineal positions with electrical charges to attract color toner.

DETAILED DESCRIPTION OF PREFERRED EMBODIMENTS OF THE INVENTION

While the present invention has particular application to electrophotographic laser color printers, it is understood that the invention has equal applicability in any laser scanning apparatus which is designed to reproduce digital raster data, including digital photocopiers. Therefore, when we use the expression "printer", we mean to include any apparatus which is configured to print a color image from digital raster data using a laser scanner. Further, while the present invention is generally described as a four laser embodiment, it is to be appreciated that the invention should not be considered as being limited to only a four laser embodiment. In fact, as few as two lasers can be used.

The Apparatus

Figure 2:
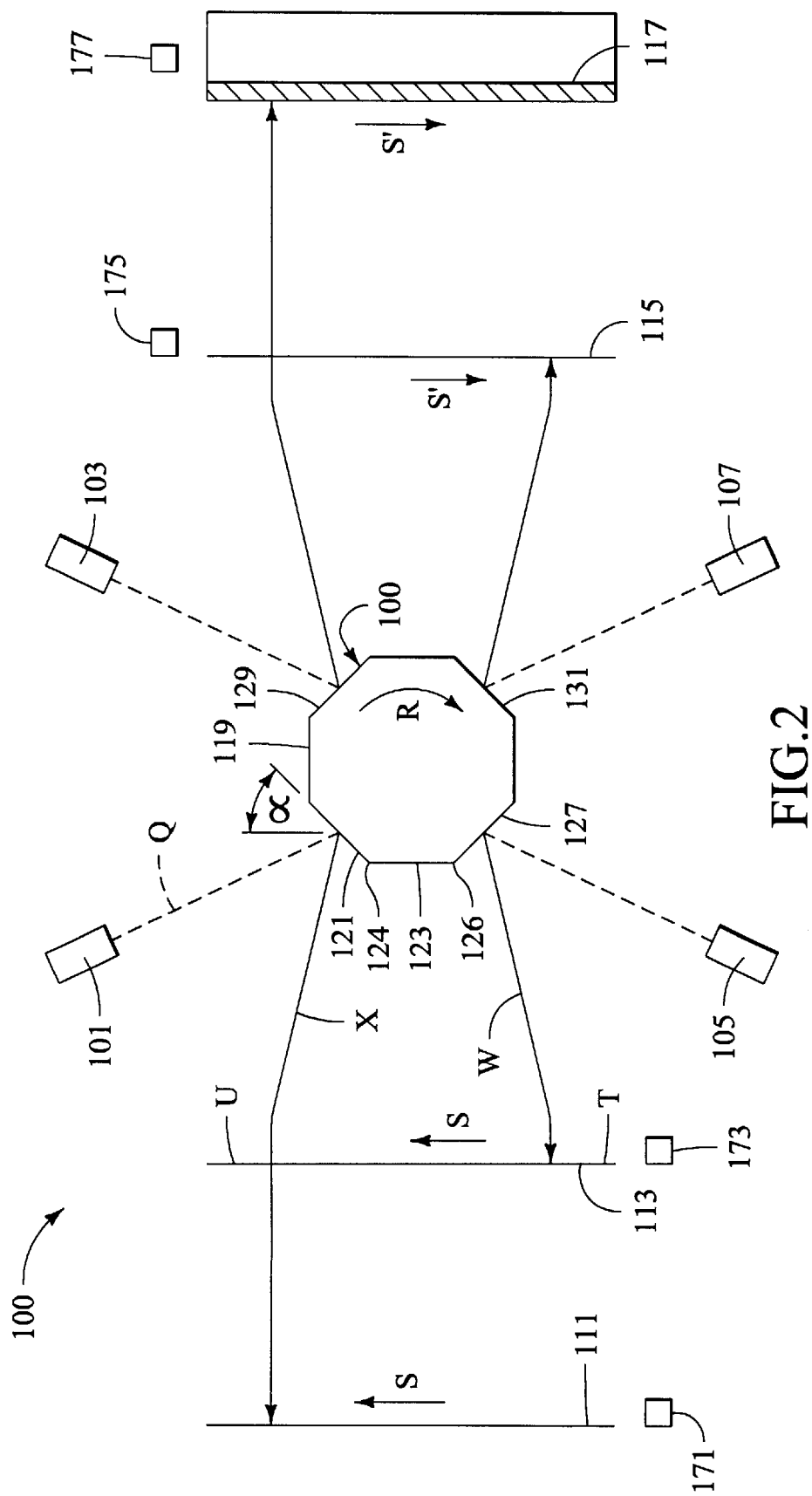
FIG. 2 is a plan view schematic diagram depicting a simplified version of the present invention.

Turning to FIG. 2, a plan view schematic diagram depicting a simplified version of the present invention is shown. FIG. 2 shows a scanning section 100 of a color laser printer comprising four lasers 101, 103, 105 and 107 and a single rotatable, polygon-sided mirror 110. The rotatable mirror will hereinafter be known as the "rotating mirror" since during printing of an image, the mirror rotates. The scanning section 100 further includes deflector mirrors 111, 113, 115 and 117 for deflecting the beams of laser energy from respective lasers 105, 101, 103 and 107 onto the photoconductive material (not shown). In the embodiment shown in FIG. 2, the lasers are mounted in a plane above the rotating mirror 110, and the deflector mirrors 111, 113, 115 and 117 are angled so as to project the laser beams downwards "into" the page. Deflector mirror 117 is indicated in correction sectional view, while deflector mirrors 111, 113 and 115 are shown merely as lines for simplicity. Further, deflector mirrors 113 and 115 lie in a first plane below the rotating mirror 110, while deflector mirrors 111 and 117 lie in a second, lower plane beneath the rotating mirror. Accordingly, beam "X" from laser 101 passes above deflector mirror 113 before striking deflector mirror 111. Similarly, the beam from laser 103 passes above deflector mirror 115 before striking deflector mirror 117.

Figure 4:
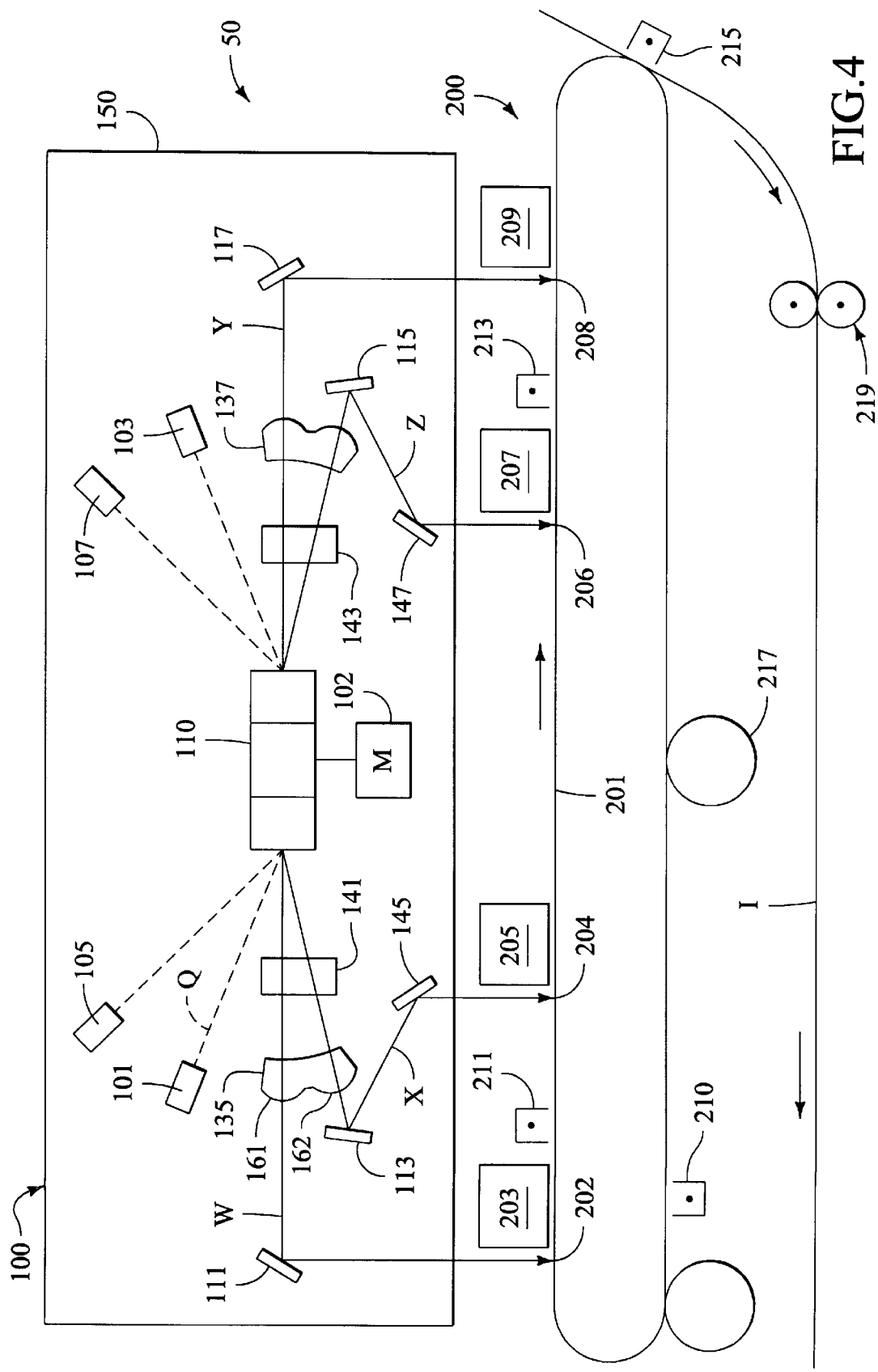
FIG. 4 is a side elevation schematic diagram of one embodiment of the present invention using a photoconductor belt in the photoconductor section of the printer.

The rotating, polygon-sided mirror 110 in FIG. 2 is shown in top view. A side view is shown in FIG. 4. While the rotating mirror 110 is shown as having 8 sides, a larger or lesser number of sides can be employed. Preferably, the rotating mirror has at least as many sides as there are lasers. Each side preferably comprises a reflective facet which acts as a mirror to reflect a beam of laser energy from a laser to a deflector mirror. A typical surface for the reflective facets is ground, polished aluminum. The rotating mirror 110 of FIG. 2 is shown rotating in a clockwise direction, indicated by arrow "R". An exemplary scan process will now be described with reference to laser 101.

Laser 101 comprises a laser diode assembly which includes not only the laser itself for generating the beam of laser energy, but also includes complementary optical components (not shown) for correcting astigmatism and the like. The laser 101 generates a beam "Q" of pulsed laser energy which is projected onto reflective facet 121 of the rotating mirror 110. The beam "Q" is pulsed in response to digital data contained in a raster image file, as described in the Background section above. The beam "Q" is reflected from the reflective facet 121 at the angle of incidence α, and the reflected beam "W" is directed towards the deflector mirror 113. The deflector mirror 113 directs the beam "W" downwards to the photoconductor (not shown). As the rotating mirror 110 rotates in direction "R", the angle of incidence α between beam "Q" and the reflective facet 121 increases, causing the reflected beam "W" to move in the direction of the arrow "S" on deflector mirror 113. In this manner, the pulsed beam of laser energy from laser 101 is scanned across the deflector mirror 113 from point "T" to point "U", and consequently across the photoconductive material on the photoconductor. Preferably, the deflected beams are directed to predetermined, relative positions on the photoconductor or photoconductors to ensure accurate registration of the resulting image. That is, although the photoconductor is configured to move with respect to the deflected beam, each beam is preferably directed to a point on a line fixed in space across which the photoconductive material is moved.

When the mirror rotates to the point where laser beam "Q" is projected on the apex 124 between reflective facets 121 and 123, the beam quickly returns from point "U" to point "T" on the deflector mirror 134, to begin scanning the next line of the raster image data onto the photoconductor. It is possible, however, that the beam can in fact pass beyond points "T" and "U" in the scanning process, due to the geometry of the rotating mirror 110 and the lasers. Accordingly, sensors 171, 173, 175 and 177 located at the edge of the photoconductor (not shown) which are known as "start of scan detectors" can be provided to detect when the beam begins to pass within the photoconductor area, and thus start pulsing the beam in synchronization to the photoconductor area to be exposed. Data from the edge sensors can be used to control the lasers, for example, to shut them off when the beam is outside of the photoconductor areas. While the laser is returning from one edge of the photoconductor to the other to begin a new scan, the photoconductor is advanced to receive the exposure information from the next line of raster image data via the deflected beam. While reflective facet 121 is reflecting beam "Q" from laser 101, a similar phenomena is occurring with laser 103 and reflective facet 129, laser 107 and reflective facet 131, and laser 105 and reflective facet 127. In this manner, four laser beams can be simultaneously scanned onto photoconductor material using a single rotating polygon-sided mirror. While laser beams from lasers 101 and 105 are scanned in the direction "S" indicated on their respective deflector mirrors 113 and 111, the beams from lasers 103 and 107 are scanned in the opposite direction, as indicated by arrows "S'" on respective deflector mirrors 115 and 117. Preferably, each laser beam is directed to a discrete reflective facet on the rotating mirror 110 to prevent interference between beams.

The configuration shown in FIG. 2 is useful for distributing the beams deflected to the photoconductive material over a relatively long distance (i.e., the distance between deflector mirrors 111 and 117). This can be useful since the photoconductor section of the printer is typically provided with a dedicated developing station for each laser. Because the developing stations require a certain minimum distance between them, including any intermediate charging stations, the overall distance between the first and last developing station can be quite long.

Figure 3:
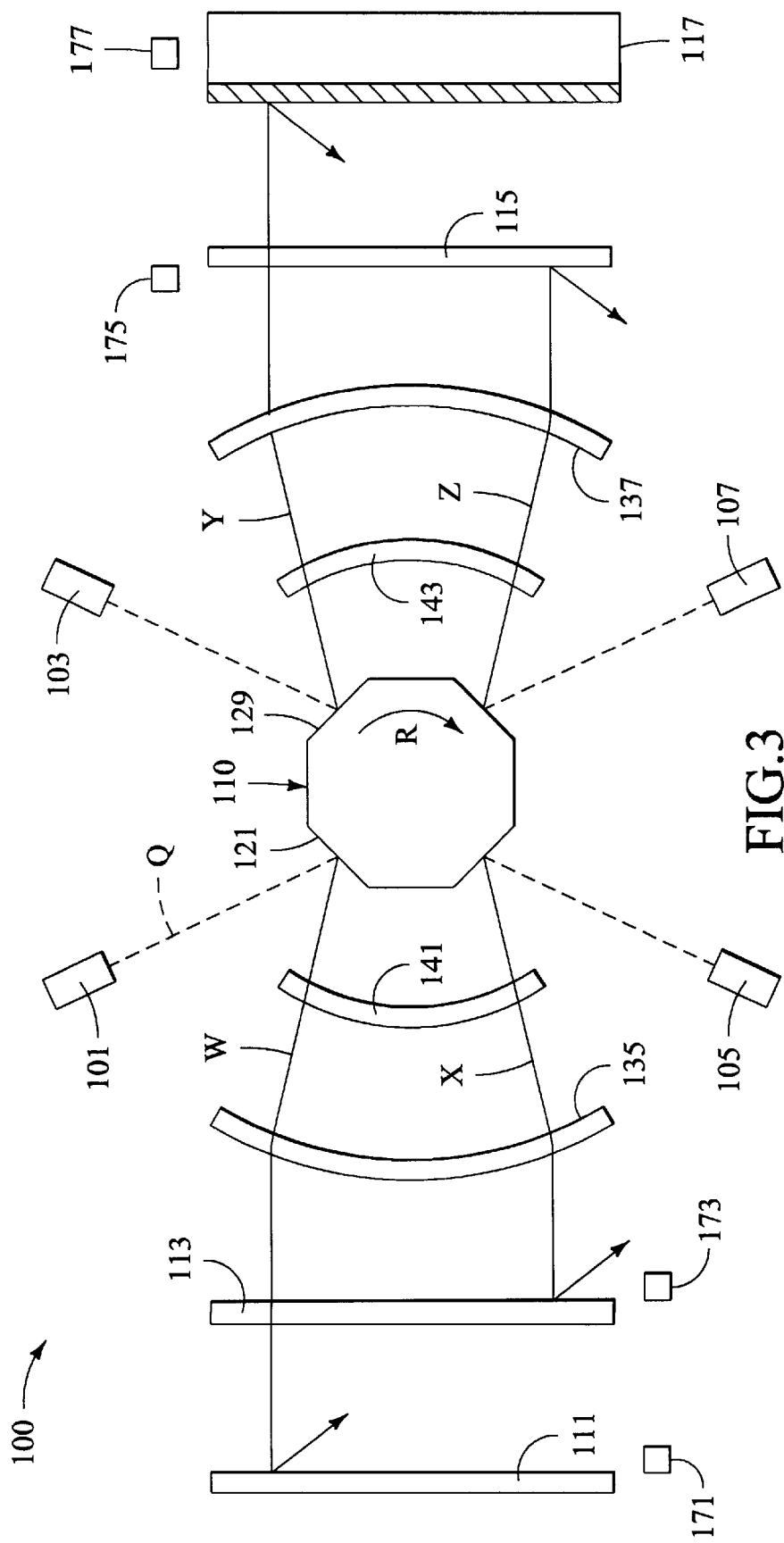
FIG. 3 is a plan view schematic diagram similar to FIG. 2, but with the inclusion of optical elements.

Turning now to FIG. 3, a schematic diagram of the scanning section 100 of FIG. 2 is shown in plan view with additional details. FIG. 3 further depicts optical elements which are preferably included in the scanner section 100. The optical elements include optical focusing elements 135 and 137 which are positioned and configured to focus beams of laser energy generated by the lasers onto the photoconductive material. These lenses are commonly known as "f-θ" lenses. The optical focusing elements correct the focus of the beams of laser energy from the lasers as a function of the relative facet angle as the laser scans out the raster line of data across the photoconductor surface.

Optical focusing elements 135 and 137 and are positioned between the rotating mirror 110 and the deflector mirrors to intercept the beams of laser energy reflected from the reflective facets of the rotating mirror. The optical focusing elements focus the projected laser beams to a point, to remove the ellipsoidal shape the projected beams would tend to take on as a result of being scanned across the deflector mirror at an angle in the absence of the focusing elements. The optical focusing elements also tend to remove an inherent elliptical shape the projected beam takes on even in the absence of being projected at an angle other than normal (perpendicular) to the photoconductor surface. This is depicted in FIG. 3 by the "straightening" of the four represented beams, "W", "X", "Y" and "Z" such that they strike their respective deflector mirrors 111, 113, 117 and 115 at an angle normal to the surface of the mirror in the plane of the laser beam, rather than at an angle.

The scanning section shown in FIG. 3 includes a first focusing lens 135 to focus beams "W" and "X" from respective lasers 101 and 105, as well as a second focusing lens 137 to focus beams "Y" and "Z" from respective lasers 103 and 107. Focusing lenses 135 and 137 can be the single lenses shown, or they can comprise individual lenses, one for each laser. Lenses 135 and 137 can also comprise compound lenses, which are actually two individual optical elements joined together in a single casting or molding, such as shown in FIG. 4.

In addition to the optical focusing elements 135 and 137, the scanning section also preferably includes optical alignment elements 141 and 143. The optical alignment elements are positioned and configured to align the beams of laser energy reflected by the reflective facets of the polygonal-sided mirror 10. Such alignment is advantageous to ensure that the beams are directed to the same, relative predetermined lineal positions on the photoconductive material, regardless of which reflective facet on the rotating mirror reflected the beam. The optical alignment elements help to compensate for relative grinding errors between reflective facets on the rotating mirror, and also help to remove alignment errors which can be introduced by wear in the bearings which support the rotating mirror. These errors typically cause the beam to be deflected in a direction normal to the direction of photoconductor travel, and can contribute to the generation of moiré interference patterns on the resultant printed image. The alignment lenses typically comprise cylindrical lenses which provide this correction continuously across the scan line. Beams of laser energy which would otherwise be directed too high by a reflective facet of the rotating mirror are corrected downward, and beams which would otherwise be directed too low are corrected upwards. Beams which are correctly directed by the reflective facets pass through the optical alignment elements without any correction.

The scanning section shown in FIG. 3 includes a first alignment lens 141 to align beams "W" and "X" from respective lasers 101 and 105. The scanning section also includes a second alignment lens 143 to align beams "Y" and "Z" from respective lasers 103 and 107. It is understood that the alignment of the beams is to the relative predetermined lineal positions on the photoconductive material. The present invention allows a single lens to be used to align two laser beams, as indicated in FIG. 3, rather than four separate lenses, one for each beam.

Turning now to FIG. 4, a side elevation schematic diagram of a color laser printer 50 having a scanning section 100 in accordance with the present invention is shown. The printer 50 further includes a photoconductor section 200. In the embodiment shown in FIG. 4, the photoconductor section comprises a belt 201 which supports and transports the photoconductive material (not shown) past the developing stations 203, 205, 206 and 207 in direction shown by arrow "P". The photoconductive material is first charged to a base electrical potential by charging unit 210. As the photoconductive material is moved along on the belt 201, the developing stations 203, 205, 206 and 207 apply toner to the belt in response to selective exposure of the photoconductive material by the beams of laser energy from the lasers. As shown, laser 101 exposes the photoconductor material at the fixed relative lineal position 202; laser 105 exposes the photoconductor material at the fixed relative lineal position 204; laser 107 exposes the photoconductor material at the fixed relative lineal position 206; and laser 103 exposes the photoconductor material at the fixed relative lineal position 208. Developing stations 203, 205, 206 and 207 can correspond to the toner colors yellow, magenta, cyan and black. In this manner, one color can be printed on top of another color on the same pixel. Such allows for a greater palate of colors to be produced by the printer. This type of printing is known as "dot-on-dot" or "pixel-on-pixel" color printing. However, for a subsequent color to be printed on top of already developed toner, the configuration shown in FIG. 4 requires that the photoconductive material be exposed through already applied toner.

The photoconductor section 200 can also be provided with intermediate charge stations 211 and 213 to recharge the photoconductive material prior to applying toner from respective developers 205 and 209. The decision to add intermediate charging units is guided by the electrical characteristics of the toners selected for use in the printer.

After the belt 201 has moved a portion of the photoconductive material past all of the developer stations, the developer is transferred from the belt 201 to the media "I" on which the image is to be printed. This transfer of toner to the media "I" is performed by the transfer unit 215 which applies an electrical potential sufficient to attract the toner from the photoconductive material on the belt 201 to the media "I". Once the toner is applied to the media "I", it is fused to the media by fusing station 219. Fusing can be accomplished by heat and/or pressure. The resultant image-printed media is then forwarded to a discharge tray (not shown) where it can be picked up by the user. The photoconductor belt 201 is then cleaned at cleaning station 217 to remove any residual toner.

It should be emphasized that the developing section of the printer is independent from the scanning section, and that the scanning section of the present invention can be used with various developing sections. Two additional embodiments showing printers having different developing sections than that shown in FIG. 4 will be discussed further below.

The scanning section 100 of the printer 50 shown in FIG. 4 comprises the components discussed above for FIG. 3, as well as some additional components which will now be discussed. The scanning section 100 of FIG. 4 shows the motor 102 (indicated by the letter "M") which can be used to drive the rotating, polygonal-sided mirror 110. The rotating mirror 110 can be supported by bearings, and the motor can be an electro-mechanical motor coupled to the rotating mirror by a drive shaft. The motor can also comprise a magnetic drive, and the rotating bearing can be suspended in a magnetic field. The drive force for the rotating mirror 110 and the manner of supporting the mirror are selected based on limiting vibration of the rotating mirror, as well as durability and cost considerations.

Preferably, the focal paths of each of the laser beams are the same length. The focal path is the distance from the emergent point on the focusing lenses (135 or 137) to the point of impact on the photoconductive material (points 202, 204, 206 and 208). Maintaining equal focal lengths for each laser beam ensures that the area of exposure for each pixel will be approximately the same diameter. For example, the distance laser beam "W" travels from emergent point 161 on the focusing lens 135 to the point 202 on the photoconductive belt 201 should preferably be the same as the distance laser beam "X" travels from focusing lens emergent point 162 to point 204 on the belt 201. Likewise, the corresponding distances for laser beams "Y" and "Z" should be equal to one another as well as to the focal lengths of beams "W" and "X". In order to obtain this desirable characteristic of essentially equivalent focal lengths, secondary deflector mirrors can be provided to overcome geometrical and space considerations within the housing 150. For example, secondary deflector mirrors 145 and 147 provide additional beam focal path length for respective laser beams "X" and "Z", respectively. By proper positioning of such secondary deflector mirrors, the focal length of these beams can be lengthened to make them essentially equivalent to the focal lengths of beams "W" and "Y".

Optical focusing elements 135 and 137 are shown in FIG. 4 as compound lenses. That is, they each comprise two optical components, the two components being joined together in a single unit. This configuration assists in ensuring that the focusing lenses are properly aligned when installed in the housing 150. That is, rather than having to align four separate lenses, only two elements need to be aligned.

Figure 1:
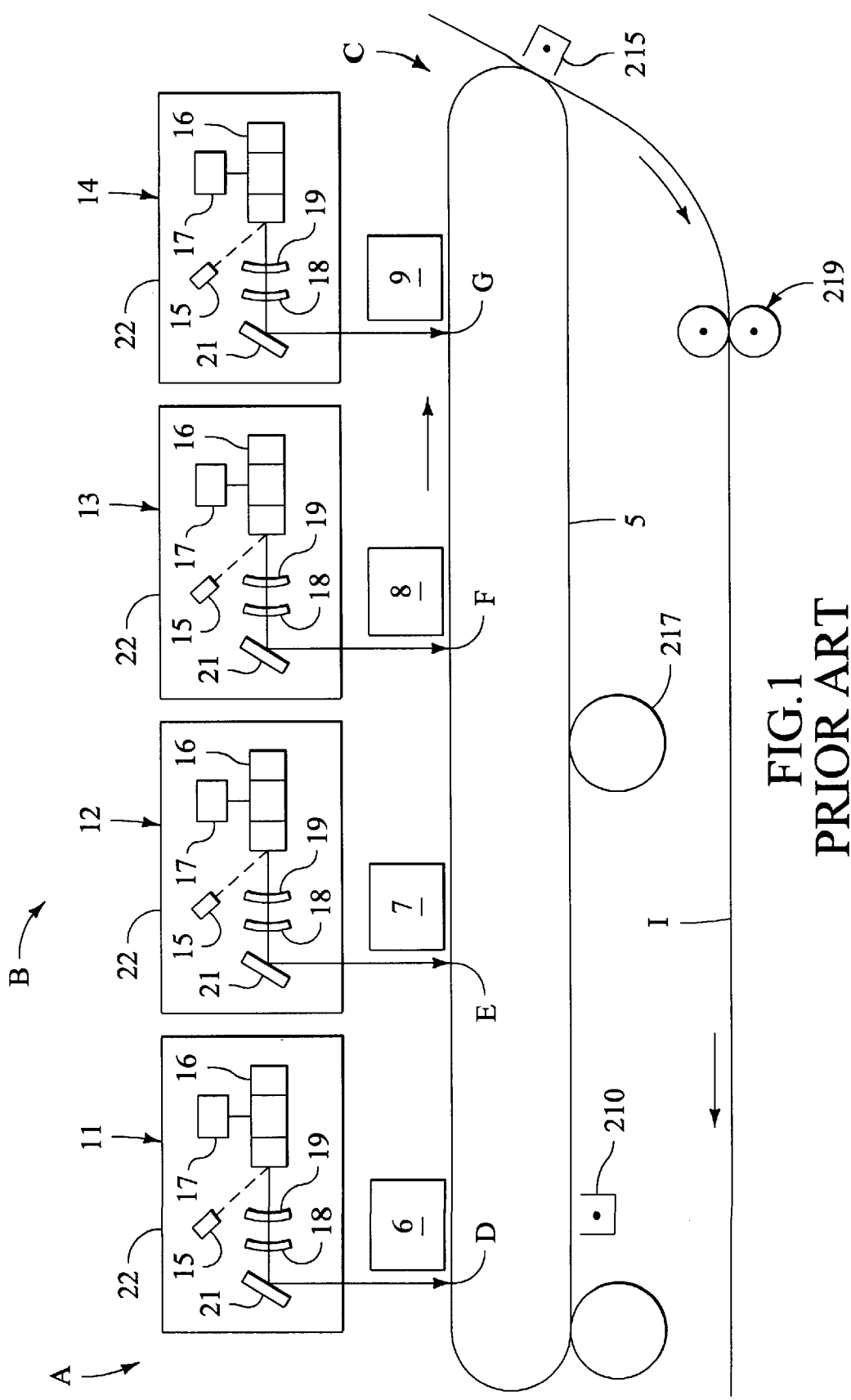
FIG. 1 is a side elevation schematic of a prior art color laser printer.

An advantage of the present invention over the prior art is that the use of a single housing for the lasers other components of the scanning sections allows focal lengths of the laser beams to be increased. Comparing the prior art scanning section "B" of FIG. 1 to the scanning section 100 of the present invention in FIG. 4, it is seen that the individual scanning stations 11, 12, 13 and 14 in the prior art offer much less room to increase the focal length of the laser beam than does the housing 150 of scanner section 100 of the present invention. The advantage of allowing for greater focal lengths is that the optical elements (the optical focusing elements and the optical alignment elements) can be designed to make smaller corrections to the laser beams to achieve the same overall corrective result. That is, a smaller correction over a longer focal length can achieve the same final corrective result as a large correction over a short focal length. As the correction which needs to be made by a lens increases, the complexity and quality of the lens must also increase.

The housing 150 of FIG. 4 supports and secures the lasers 101, 103, 105 and 107, the rotating polygon-sided mirror 110 and its motor 102, the optical focusing elements 135 and 137, the optical alignment elements 141 and 143, and the deflecting mirrors 111, 113, 115, 117, 145 and 147 all in fixed, relative position to one another and to the photoconductor section 200. In the prior art scanning section shown in FIG. 1, the four scanning stations 11, 12, 13 and 14 all need to be aligned with respect to one another, and with respect to the photoconductor section "C". The scanning section 100 of the present invention shown in FIG. 4 needs only to be aligned with respect to the developing section 200. Preferably, the housing 150 comprises a precision casting. Common materials for such castings comprise aluminum and glass filled polycarbonate.

Figure 5:
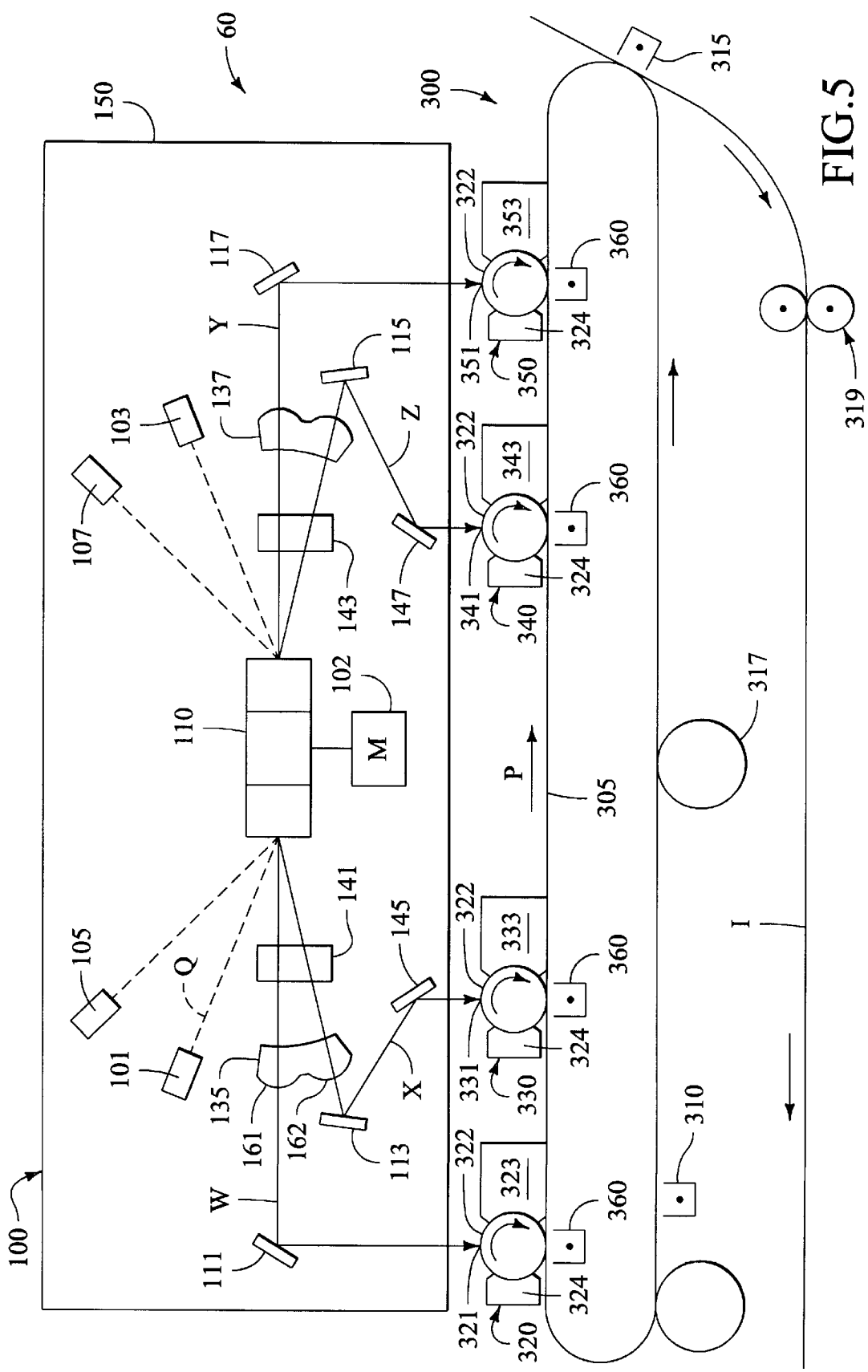
FIG. 5 is a side elevation schematic diagram of another embodiment of the present invention using individual photoconductors and a transfer belt in the photoconductor section of the printer.

Turning to FIG. 5, a second embodiment of an electrophotographic printer 50 having a scanning section 100 in accordance with the present invention is shown. It should be immediately apparent that the scanning section 100 of FIG. 5 is identical to the scanning section 100 of FIG. 4. The printer 60 of FIG. 5 contains a developing section 300 which is different than the developing section 200 of the printer 50 of FIG. 4. The developing section 300 of FIG. 5 comprises four expose-develop stations 320, 330, 340 and 350. Each expose-develop station has its own dedicated drum 322 supporting photoconductive material (not shown). The drums 322 turn within their respective expose-develop stations. In this manner, no drum is ever developed with more than one toner. This is in contrast to the single belt version of the developing station 200 of FIG. 4, where a single point on the photoconductor belt 201 can be developed by as many as four toners. In the developing station 300 of FIG. 5, each photoconductor drum 322 is first charged with a base electrical potential by chargers 324. Each drum is then selectively exposed by a respective dedicated laser. For example: laser 101 exposes the drum 322 at expose-develop station 320 at point 321; laser 105 exposes the drum 322 at expose-develop station 330 at point 331; laser 107 exposes the drum 322 at expose-develop station 340 at point 341; and laser 103 exposes the drum 322 at expose-develop station 350 at point 351. Following exposure by the lasers, each drum is individually developed using developers 323, 333, 343 and 353 to apply toner to the drums 322. The toner from each drum 322 is then transferred to transfer belt 305 which moves in direction "P". The four expose-develop stations 320, 330, 340 and 350 can correspond respectively to the applications of the colors yellow, magenta, cyan and black to the transfer belt 305. Accordingly, when we use the expression "photoconductive material", we mean to include all of the photoconductive material in the developer section, whether it is support on a single belt or drum or on a plurality of drums, unless expressly stated otherwise.

Thereafter, the transfer of the toner from the transfer belt 305 to the media "I" is accomplished similar to the manner described above for developing section 200. That is, the transfer of toner to the media "I" is performed by the transfer unit 315 which applies an electrical potential sufficient to attract the toner from the photoconductive material on the transfer belt 305 to the media "I". Once the toner is applied to the media, it is then fused to the media by fusing station 319. The resultant image-printed media is then forwarded to a discharge tray (not shown) where it can be picked up by the user. The transfer belt is then cleaned at cleaning station 317 to remove any residual toner. The developer section 300 of FIG. 5 does not require the photoconductive material to be exposed over existing toner, and is generally considered to result in a higher quality end image. However, this benefit is to be weighed against the additional complexity of the developer section 300 over the developer section 200. In any event, the scanner section of the present invention will work with either developer section.

Figure 6:
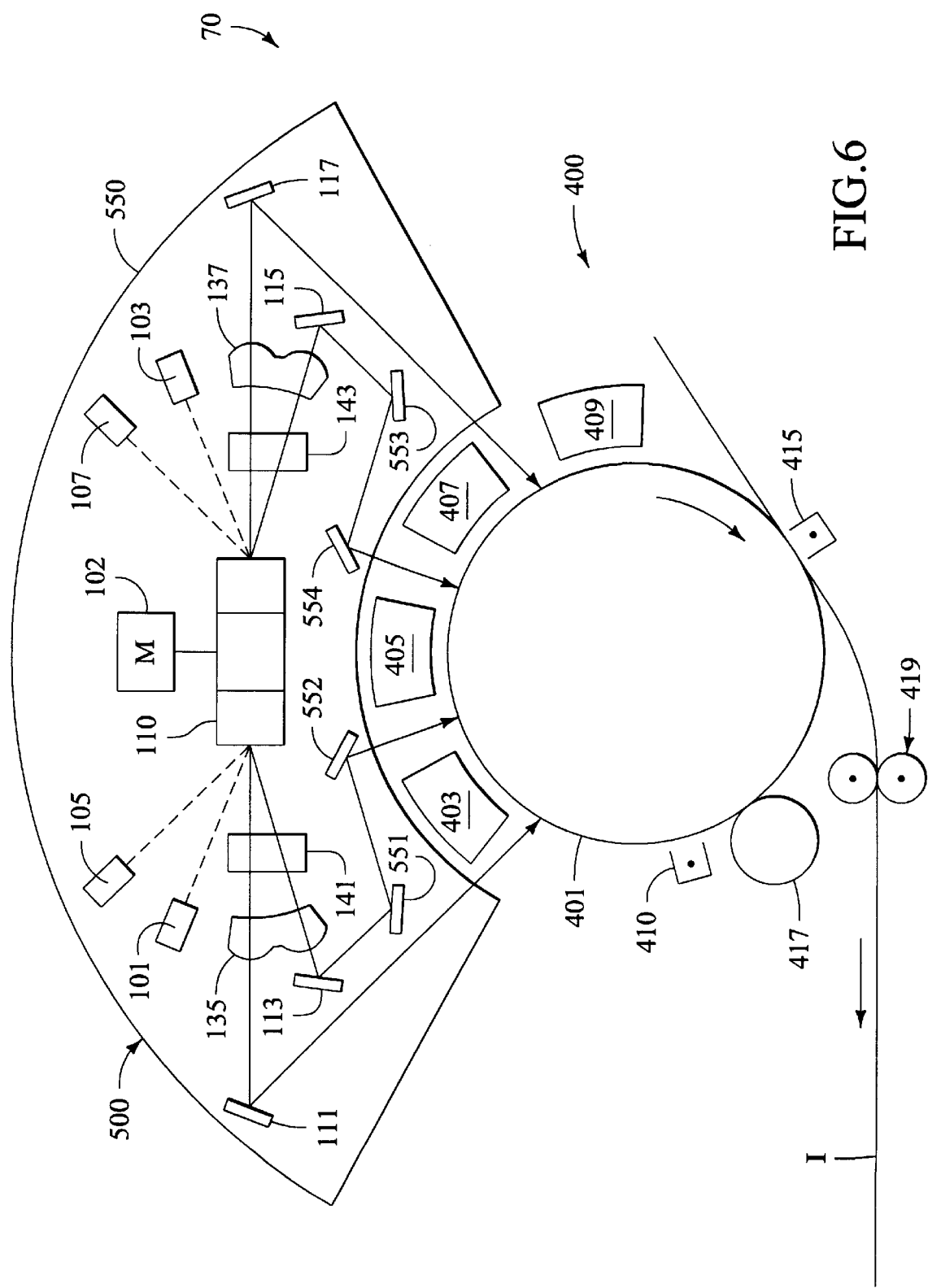
FIG. 6 is a side elevation schematic diagram of a third embodiment of the present invention using a large photoconductor drum in the photoconductor section of the printer.

Turning now to FIG. 6, a third embodiment of an electrophotographic printer 70 having a scanning section 500 in accordance with the present invention is shown. The printer 70 has a developer section 400 which includes a single photoconductor drum 401 which supports photoconductive material (not shown). The developer section further includes four develop-charge stations 403, 405, 407 and 409. Prior to each develop-charge station 403, 405, 407 and 409, the photoconductive material on the drum 401 is exposed by one of the lasers 101, 105, 107 or 103, respectively. Prior to the first exposure point, the photoconductor is charged with a base electrical charge with charging unit 410. In the first develop-expose station, the toner color corresponding to the selective exposure information imparted to the photoconductive material by laser 101 is applied to the photoconductor drum 401 by developer 403. The photoconductor drum is then recharged to the base electrical potential before being exposed by laser 105. Following exposure by laser 105, the toner color corresponding to the selective exposure information imparted to the photoconductive material by laser 105 is applied to the photoconductor drum 401 by developer 405. Similar expose-develop- and recharge features are performed by developer units 407 and 409, except that developer unit 409 does not recharge the photoconductor drum after developing the photoconductive material with its toner.

Following exposure and developing by all four developer stations 403, 405, 407 and 407, the resultant image on the photoconductor drum 401 is transferred to the media "I" in the manner described above. That is, the transfer of toner to the media "I" is performed by the transfer unit 415 which applies an electrical potential sufficient to attract the toner from the photoconductive material on the drum 401 to the media "I". Once the toner is applied to the media, it is then fused to the media by fusing station 419. The resultant image-printed media is then forwarded to a discharge tray (not shown) where it can be picked up by the user. The drum 401 is then cleaned at cleaning station 417 to remove any residual toner. The developer section 400 shown in FIG. 6 is quite similar to the developer system 200 of FIG. 4, since for a subsequent color to be printed on top of already developed toner, this configuration requires that the photoconductive material be exposed through the already applied toner.

The scanning section 500 of the printer 70 of FIG. 6 is similar to the scanner section 100 of the previous embodiments shown in FIGS. 4 and 5. However, to accommodate the large drum 401 of the developer section 400, the housing 550 for the various components is preferably configured in the concave or curved shape shown in FIG. 6. Further, additional deflector mirrors 551, 552, 553 and 554 can be required to direct the beams of laser energy from the lasers to the photoconductor drum 401, as shown.

While FIGS. 2 through 6 all show a four laser embodiment of the scanning section, in an alternate embodiment the scanner section can comprise only two lasers. Turning to FIG. 4, such a two-laser scanning section would delete lasers 103 and 107, as well as optical elements 137 and 143, and deflector mirrors 115, 117 and 147 from the scanning section 100. Such would result in a highly simplified scanning section. However, a two laser scanner generally limits either number of colors that can be printed onto the image, the quality of the resultant image, and/or the speed with which the image can be printed.

Figure 7:
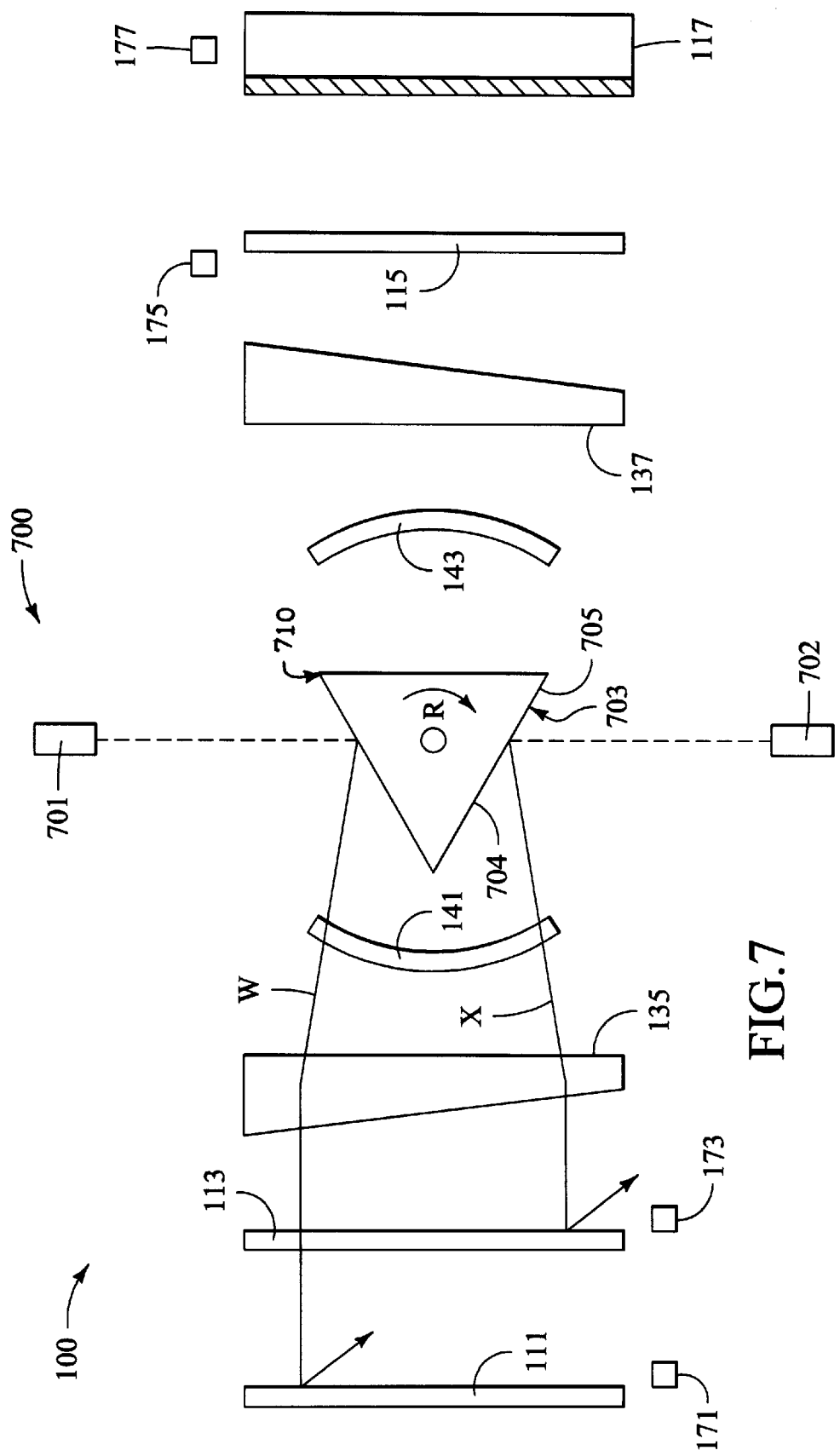
FIG. 7 a plan view schematic diagram similar to FIG. 3, but with an alternate orientation of the lasers and the rotating mirror.

In another embodiment of the invention, at least one of the lasers can be positioned with respect to the rotating mirror such that the exposure of a single reflective facet of the rotating mirror to the beam from the laser is sufficient to make two scans onto the photoconductive material. Such an embodiment is shown in FIG. 7. FIG. 7 depicts a plan view of a scanning section similar to that shown in FIG. 3, except that the four lasers of FIG. 3 have been replaced with the two lasers 701 and 702. The lasers 701 and 702 are oriented such that the laser beam will be scanned by the rotating three-sided mirror 710 in a sweep which will project the laser beam first to one set of optical elements and deflection mirrors on one side of the rotating mirror, and then to the other set of optical elements and deflection mirrors on the other side of the rotating mirror. For example, reflective facet 703 is composed of a first half 704 and a second half 705. When the beam from laser 702 strikes the first half 704 of the facet 703, it is directed towards the optical elements 143, 737, and deflection mirror 115. However, when the beam from laser 702 strikes the second half 705 of the facet 703, it is directed towards the optical elements 141, 735, and deflection mirror 113, as indicated by beam "X" in FIG. 7. In this manner, 4 scans can be accomplished using only two lasers. A rotatable mirror having four polygonal reflective sides can also be used in this configuration. However, a lower number of polygonal sides will reduce scanning time in this configuration.

Figure 8:
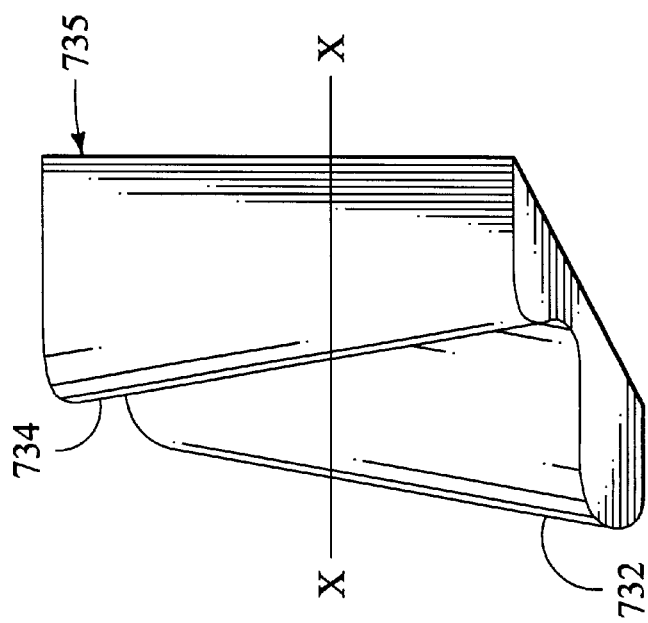
FIG. 8 is an oblique drawing of a compound lens which can be used as an optical focusing element in one embodiment of the invention.

When the configuration of FIG. 7 is used, the f-θ optical focusing elements will be different than those shown for the four-laser system of FIG. 3. As shown in FIG. 7, optical focusing element 135 is intended to intercept beam "W". The optical element gets thicker as the angle of incidence of the beam on the reflective surface increases. Accordingly, a complementary optical focusing element will be required for beam "X", which resembles lens 735 except that it is essentially mirrored about a horizontal line. This applies as well for optical focusing element 737. An exemplary lens 735 is shown in FIG. 8. The lens 735 of FIG. 8 is a compound lens and comprises a first element 732 for focusing beam "W" of FIG. 7, and a second element 734 for focusing beam "X". The lens 735 can then be rotated 180 degrees and used for the optical focusing element 737.

Figure 9:
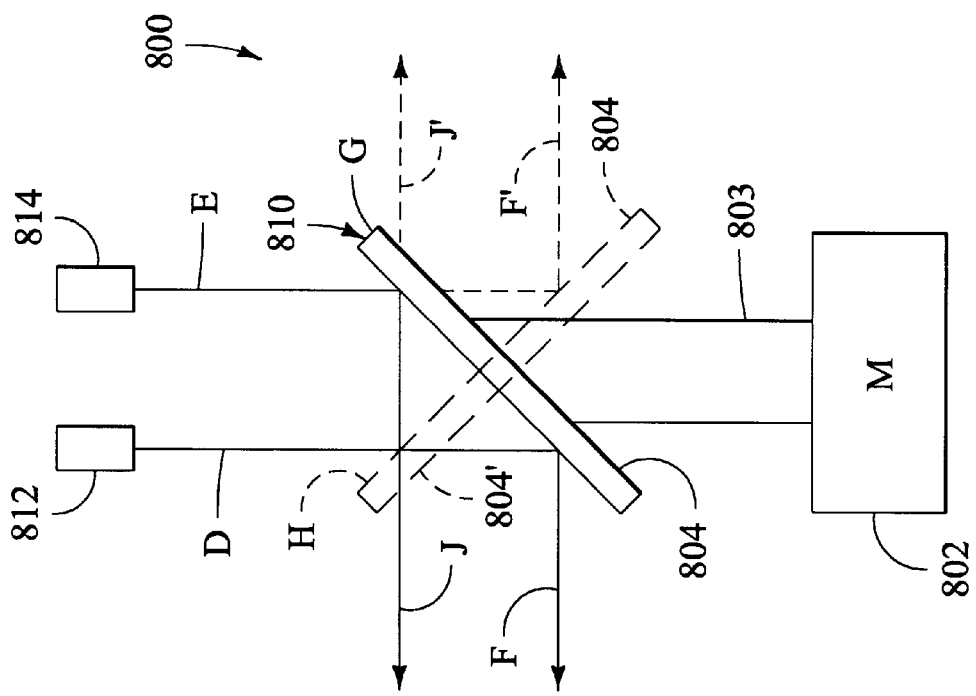
FIG. 9 is a side elevation schematic diagram of another embodiment of the present invention using a single, flat reflective surface and two lasers to generate four scanning beams.

Turning now to FIG. 9, an alternate embodiment for achieving four-beam scanning using two lasers and a single, flat reflective surface is shown. The scanning section 800 of FIG. 9 is shown in a simplified side elevation view and does not show optical focusing elements, optical alignment elements, and reflective mirrors, merely for the sake of simplicity of the diagram. However, it is understood that these elements are included in an implementation of the embodiment shown. As depicted in FIG. 9, the scanning section 900 comprises a single, flat rotatable mirror 810 having a single reflective surface 804 and two lasers 812 and 814. The reflective surface 804 is mounted at an angle to the beams "D" and "E" from the respective lasers 812 and 814. Preferably, the flat reflective surface 804 is mounted at an angle of 45 degrees to the direction of the laser beams "D" and "E" projected by the lasers 812 and 814. The motor 802 causes the reflective surface 804 to be rotated about an axis 803 which is parallel to the direction of laser beams "D" and "E". In a first position "G", the beams "D" and "E" from the respective lasers 812 and 814 are reflected in a first direction as respective reflected beams "F" and "J" and can then be reflected by a deflector mirror (not shown) to first and second positions on the photoconductor. As the reflective surface 804 is rotated about axis 803, the beams "F" and "J" scan across the photoconductor.

The reflective surface 804 is also depicted in position "H" after it has been rotated 180 degrees from the position depicted as position "G". In position "H", the laser beams "D" and "E" are reflected as respective beams "F'" and "J'" in opposite directions from beams "F" and "J", and can therefore be directed to different positions on the photoconductor than are beams "F" and "J". As the reflective surface 804 is rotated about axis 803, the beams "F'"and "J'" scan across the photoconductor. In this manner, four beams can be provided to scan the photoconductor using a single, flat reflective surface and two lasers.

The Method

The invention further includes a method for scanning a color image onto photoconductive material. The method includes a first group of steps of providing certain components, in no particular order. Included in these first steps is the act of providing photoconductive material capable of being selectively configured with electrical charges to attract color toner to the photoconductive material. As described above, the photoconductive material can be provided on a single belt or drum, or a plurality of drums. The method further includes providing at least a first and a second laser capable of generating a pulsed laser beam to selectively configure the photoconductive material with electrical charges. Preferably the method includes providing four lasers. However, as described above, the method can be practiced with as few as two lasers. Finally, the first series of steps includes the act of providing a rotating, polygonal-sided mirror having a plurality of reflective facets corresponding to sides of the polygon. Preferably, the rotating mirror has at least four reflective facets. The pulsing of the lasers to generate the pulsed laser beams is in accordance with stored, digital raster image data which is to be used to generate a final image or print.

The next series of steps includes generating a first pulsed laser beam with one of the lasers, and also generating a second pulsed laser beam with a second one of the lasers. The first laser beam is then directed to a first reflective facet of the polygonal-sided mirror to cause the first pulsed laser beam to be reflected to a first predetermined, relative lineal position on the photoconductive material. The second laser beam is directed to a second reflective facet of the polygonal-sided mirror to cause the second pulsed laser beam to be reflected to a second predetermined, relative lineal position on the photoconductive material. As discussed above, it is understood that the photoconductive material is moved relative to these predetermined lineal positions, and that the laser beams scan along the lineal positions, as described above and further below.

The next step in the method includes rotating the polygonal-sided mirror to cause the first and second pulsed laser beams to move across the photoconductive material along their respective first and second predetermined lineal positions on the photoconductive material. This causes the photoconductive material to be selectively configured or exposed along the respective lineal positions with electrical charges to attract color toner.

The photoconductive material is then advanced relative to the predetermined lineal positions, and the steps of generating laser pulses and rotating the polygonal-shaped mirror, as described above, are repeated. Thereafter, the color toner can be transferred to a tangible medium to generate a final color image.

While the above invention has been described with particularity to specific embodiments and examples thereof, it is understood that the invention comprises the general novel concepts disclosed by the disclosure provided herein, as well as those specific embodiments and examples shown and described herein.

We claim:

1. An inline color laser printer, comprising:
    a photoconductor section comprising photoconductive material configured to be exposed to receive at least three distinct color toners in a selective manner representative of a color image to be printed; and
    a scanning section comprising:
        at least three lasers, each said laser configured to generate pulsed beams of laser energy to be directed to the photoconductor section to selectively expose the photoconductive material; and
        a single rotatable, polygonal-sided mirror having a plurality of discrete reflective facets corresponding to selected sides of the polygon, the polygonal-sided mirror being positioned relative to the at least three lasers and the photoconductor section such that the pulsed beams of laser energy from each said laser are reflected by an associated one of the discrete reflective facets of the polygonal-sided mirror to a predetermined relative lineal position on the photoconductive material, each predetermined relative lineal position being associated with a selected laser, and further such that as the polygonal-sided mirror rotates, the reflective facets are moved along a curved path to cause the beams of laser energy from each said laser to be variably reflected from the reflective facets and thereby move along their corresponding predetermined relative lineal positions on the photoconductive material to thereby selectively expose lines on the photoconductive material.

2. The color laser printer of claim 1 further comprising an optical focusing element positioned and configured to focus beams of laser energy generated by selected ones of the lasers onto the photoconductive material.

3. The color laser printer of claim 1 further comprising an optical alignment element positioned and configured to align beams of laser energy generated by selected ones of the lasers and reflected by the reflective facets of the polygonal-sided mirror to the predetermined relative lineal positions associated with the selected ones of the lasers.

4. The color laser printer of claim 1 wherein each said laser is positioned relative to the rotatable polygonal-sided mirror and to each other laser such that laser beams from each laser do not intersect one another.

5. The color laser printer of claim 1 wherein the lasers and the rotatable polygonal-sided mirror are mounted in a single housing.

6. The color laser printer of claim 5 wherein the single housing comprises a precision casting.

7. The color laser printer of claim 1, and wherein each said pulsed beam of laser energy defines a respective focal length for each said laser between the laser and the photoconductive material, and further wherein the focal length of each laser is approximately equal in distance.

8. The color laser printer of claim 7 further comprising a plurality of deflecting mirrors positioned and configured to direct the laser beams reflected from the reflective facets to the predetermined relative lineal positions on the photoconductive material, and to produce the approximately equidistant focal lengths.

9. The color laser printer of claim 8 further comprising:
    an optical focusing element positioned and configured to focus beams of laser energy generated by selected ones of the lasers onto the photoconductive material;
    an optical alignment element positioned and configured to align beams of laser energy generated by selected ones of the lasers and reflected by the reflective facets of the polygonal-sided mirror to the predetermined lineal positions associated with the selected ones of the lasers; and
    a single housing for securing the lasers, the rotatable polygon-sided mirror, the optical focusing element, the optical alignment element, and the deflecting mirrors in fixed, relative position to one another and to the photoconductor section.

10. The color laser printer of claim 1 wherein the photoconductor section comprises:
    a continuous rotatable belt supporting the photoconductive material; and
    a plurality of developing stations, each developing station being fixedly positioned proximate to the rotatable belt and adjacent to a corresponding one of the predetermined relative lineal positions on the photoconductive material associated with the selected ones of the lasers, each developing station being configured to selectively attract color toner to the selectively exposed lines on the photoconductive material at the adjacent corresponding predetermined relative lineal position.

11. The color laser printer of claim 1 wherein the photoconductor section comprises:

a continuous, rotatable transfer belt;

a plurality of expose-develop stations, each expose-develop station comprising a rotatable drum supporting a portion of the photoconductive material, each expose-develop station being fixedly positioned proximate to the transfer belt at positions corresponding to the predetermined relative lineal positions on the photoconductive material associated with the selected ones of the lasers, each expose-develop station being configured to selectively attract color toner to the selectively exposed lines on the photoconductive material at the corresponding predetermined relative lineal position and subsequently transfer the selectively attracted color toner to the transfer belt.

12. The color laser printer of claim 1 wherein the photoconductor section comprises:

a continuous rotatable drum supporting the photoconductive material; and a plurality of developing stations, each developing station being fixedly positioned proximate to the rotatable drum and adjacent to a corresponding one of the predetermined relative lineal positions on the photoconductive material associated with the selected ones of the lasers, each developing station being configured to selectively attract color toner to the selectively exposed lines on the photoconductive material at the adjacent corresponding predetermined relative lineal position.

13. The color laser printer of claim 12 further comprising a housing for securing the plurality of lasers and the rotatable, polygonal-sided in fixed relative position to one another and to the photoconductor section, the housing being contoured to be positioned in close proximity to the plurality of developer stations.

14. A color laser printer, comprising:

a photoconductor section comprising photoconductive material configured to be exposed to receive a plurality of color toners in a selective manner representative of a color image to be printed; and a scanning section comprising:

a plurality of lasers, each said laser configured to generate pulsed beams of laser energy to be directed to the photoconductor section to selectively expose the photoconductive material; and a rotatable, polygonal-sided mirror having a plurality of reflective facets corresponding to selected sides of the polygon, the polygonal-sided mirror being positioned relative to the plurality of lasers and the photoconductor section such that the pulsed beams of laser energy from each said laser are reflected by the reflective facets of the polygonal-sided mirror to a predetermined relative lineal position on the photoconductive material, each predetermined relative lineal position being associated with a selected laser, and further such that as the polygonal-sided mirror rotates, the reflective facets are moved along a curved path to cause the beams of laser energy from each said laser to be variably reflected from the reflective facets and thereby move along their corresponding predetermined relative lineal positions on the photoconductive material to thereby selectively expose lines on the photoconductive material; and wherein a first laser is positioned with respect to the rotatable polygon-sided mirror and the photoconductor section such that a beam of laser energy from the first laser is in optical contact with one of the reflective facets throughout a predetermined angle of rotation of the rotatable polygon-sided mirror, and that during the first half of the rotation through the predetermined angle of rotation, the beam of laser energy is reflected by the reflective facet to a first predetermined relative lineal position on the photoconductive material, and during the second half of the rotation through the predetermined angle of rotation, the beam of laser energy is reflected to a second predetermined relative lineal position on the photoconductive material.

15. A method for scanning a composite color image onto photoconductive material, comprising:

providing photoconductive material configured to be selectively configured with electrical charges to attract a plurality of color toners;

providing at least a first, a second, and a third laser, each laser configured to generate a pulsed laser beam to selectively configure the photoconductive material with electrical charges;

providing a single rotatable, polygonal-sided mirror having a plurality of reflective facets corresponding to selected sides of the polygon;

generating a first pulsed laser beam with the first laser, a second pulsed laser beam with the second laser, and a third pulsed laser beam with the third laser;

directing the first pulsed laser beam to a first reflective facet of the polygonal-sided mirror to cause the first pulsed laser beam to be reflected to a first predetermined relative lineal position on the photoconductive material;

directing the second pulsed laser beam to a second reflective facet of the polygonal-sided mirror to cause the second pulsed laser beam to be reflected to a second predetermined relative lineal position on the photoconductive material;

directing the third pulsed laser beam to a third reflective facet of the polygonal-sided mirror to cause the third pulsed laser beam to be reflected to a third predetermined relative lineal position on the photoconductive material; and rotating the polygonal-sided mirror to cause the first, the second, and the third pulsed laser beams to move across the photoconductive material along their respective first, second and third predetermined relative lineal positions on the photoconductive material and thereby selectively configure the photoconductive material along the respective relative lineal positions with electrical charges to thereby expose the photoconductive material to attract respective first, second and third color toners as part of the composite color image.

16. The method of claim 15, and further comprising:

advancing the photoconductive material with respect to the respective first and second predetermined relative lineal positions;

generating subsequent pulsed laser beams with the first, second and third lasers;

directing the subsequent pulsed laser beams to discrete reflective facets of the polygonal-sided mirror to cause subsequent pulsed laser beams to be reflected to discrete lineal positions on the photoconductive material; and rotating the polygonal-sided mirror to cause the subsequent pulsed laser beams to move across the photoconductive material along their respective discrete lineal positions on the photoconductive material and thereby selectively configure the photoconductive material along the respective discrete lineal positions with electrical charges to thereby expose the photoconductive material to attract respective first, second and third color toners as part of the composite color image.

17. The method of claim 15, and further comprising:

providing a fourth laser configured to generate a pulsed laser beam to selectively configure the photoconductive material with electrical charges;

generating a fourth pulsed laser beam with the fourth laser;

directing the fourth pulsed laser beam to a fourth reflective facet of the polygonal-sided mirror to cause the fourth pulsed laser beam to be reflected to a fourth predetermined relative lineal position on the photoconductive material; and wherein the rotating of the polygonal-sided mirror causes the fourth pulsed laser beam to move across the photoconductive material along its respective fourth predetermined relative lineal position on the photoconductive material and thereby selectively configure the photoconductive material along the respective relative lineal position with electrical charges to thereby expose the photoconductive material to attract a fourth color toner as part of the composite color image.

18. The method of claim 15 further comprising focusing the laser beams prior to directing them to the photoconductive material.

19. A color laser printer, comprising:

a photoconductor section comprising photoconductive material configured to be exposed to receive a plurality of color toners in a selective manner representative of a color image to be printed; and a scanning section comprising:

a plurality of lasers, each said laser configured to generate pulsed beams of laser energy to be directed to the photoconductor section to selectively expose the photoconductive material;

a rotatable, essentially flat reflective surface mounted at an angle to, and configured to intercept, the pulsed beams of laser energy from the plurality of lasers, the rotatable mirror being rotatable about an axis parallel to the pulsed beams of laser energy such that beams of laser energy from the lasers are in optical contact with the reflective surface as the flat surface is rotated, and that during the first half of a rotation the beams of laser energy from the lasers are reflected by the reflective surface to an equal number of first predetermined relative lineal positions on the photoconductive material to thereby expose the photoconductor to receive at least first and second color toners as part of a composite color image, and during the second half of the rotation, the beams of laser energy are reflected an equal number of second predetermined relative lineal position on the photoconductive material to thereby expose the photoconductor to receive at least third and fourth color toners as part of the composite color image.

20. The printer of claim 19 further comprising a first and a second optical alignment element, the first optical alignment element being positioned and configured to align beams of laser energy during the first half of a rotation of the flat, reflective surface, and the second optical alignment element being positioned and configured to align beams of laser energy during the second half of a rotation of the flat, reflective surface.

21. A scanning section for exposing photoconductive material in an inline color laser printer, comprising:

at least three lasers, each said laser configured to generate pulsed beams of laser energy to be directed to the photoconductive material to selectively expose the photoconductive material, each said laser associated with a distinct color of toner to be applied to the photoconductive material; and a single rotatable, polygonal-sided mirror having a plurality of discrete reflective facets corresponding to selected sides of the polygon, the polygonal sided mirror being positioned relative to the at least three lasers and the photoconductive material such that as the polygonal-sided mirror is rotated, the pulsed beams of laser energy from each said laser are reflected by an associated one of the discrete reflective facets of the polygonal-sided mirror and thereby caused to scan across the photoconductive material and thereby selectively expose lines on the photoconductive material.

* * * * *